(12) United States Patent
Singh (10) Patent No.: US 12,367,466 B2
(45) Date of Patent: Jul. 22, 2025

(54) SATELLITE DATA NFT TRANSFER LEVERAGING BLOCKCHAIN AND SMART CONTRACT CAPABILITIES

(71) Applicant: Bank of America Corporation, Charlotte, NC (US)

(72) Inventor: Shailendra Singh, Maharashtra (IN)

(73) Assignee: Bank of America Corporation, Charlotte, NC (US)

(*) Notice: Subject to any disclaimer, the term of this patent is extended or adjusted under 35 U.S.C. 154(b) by 423 days.

(21) Appl. No.: 18/108,759

(22) Filed: Feb. 13, 2023

(65) Prior Publication Data

US 2024/0273482 A1 Aug. 15, 2024

(51) Int. Cl.
*G06Q 20/02* (2012.01)
*G06Q 20/30* (2012.01)
(Continued)

(52) U.S. Cl.
CPC ......... *G06Q 20/027* (2013.01); *G06Q 20/308* (2020.05); *G06Q 20/327* (2013.01); *G06Q 20/3672* (2013.01); *G06Q 20/389* (2013.01)

(58) Field of Classification Search
CPC .. G06Q 20/027; G06Q 20/308; G06Q 20/327; G06Q 20/3672; G06Q 20/389; G06Q 20/10; G06Q 20/30; G06Q 20/36; G06Q 20/065; G06Q 20/4014; G06Q 20/40; G06Q 2220/00; G06Q 20/326; G06Q 30/06; G06Q 20/401; G06Q 20/20;
(Continued)

(56) References Cited

U.S. PATENT DOCUMENTS 11,240,254 B2 2/2022 Metzger et al.
11,836,711 B2 * 12/2023 Moudgal .............. G06Q 20/102
(Continued)

OTHER PUBLICATIONS

Enhancing Space Security Utilizing the Blockchain: Current Status and Future Directions, Anastasios N. Bikos • Sathish A.P. Kumar, 2022 IEEE International Conference on Wireless for Space and Extreme Environments (WiSEE) (2022, pp. 77-82) (Year: 2022).*
(Continued)

*Primary Examiner* — Asad M Nawaz
*Assistant Examiner* — Sanaa Al Samahi
(74) *Attorney, Agent, or Firm* — Weiss & Arons LLP (57) ABSTRACT

A method for establishing an alternative transaction gateway when a default transaction network is down leveraging a network of low-orbit satellites is provided. The method may include creating, using an internet of things ("IoT") device, a non-fungible token ("NFT") associated with a transaction executed at the IoT device. The method may include storing the NFT at the IoT device pending proximity to a low-orbit satellite. The method may further include transmitting the NFT to a first low-orbit satellite when the first low-orbit satellite is within a first pre-determined proximity to the IoT device. The method may include, in response to receiving the NFT at the first low-orbit satellite, running a smart contract to identify an optimal pathway for transporting the NFT. The pathway may include the first low-orbit satellite and one or more additional low-orbit satellites from the network operating as carriers for the NFT to a centralized server.

20 Claims, 7 Drawing Sheets

(51) Int. Cl.
    *G06Q 20/32*    (2012.01)
    *G06Q 20/36*    (2012.01)
    *G06Q 20/38*    (2012.01)

(58) Field of Classification Search
    CPC .... G06Q 20/12; G06Q 20/322; H04B 7/1851; H04L 9/3213; H04L 9/50; G06N 3/045; G06N 3/02
    See application file for complete search history.

(56) References Cited

U.S. PATENT DOCUMENTS

| | | | |
|---|---|---|---|
| 2021/0118052 A1* | 4/2021 | Walser | G06Q 20/202 |
| 2021/0264407 A1 | 8/2021 | Moudgal et al. | |
| 2022/0272084 A1* | 8/2022 | Hyatt | H04W 4/70 |
| 2023/0013074 A1* | 1/2023 | Kikinis | G06Q 20/40145 |
| 2023/0017855 A1* | 1/2023 | Kikinis | H04L 9/0643 |
| 2023/0274283 A1* | 8/2023 | Kryvoshei | G06Q 20/389 |

OTHER PUBLICATIONS

"Non-Fungible Token," Wikimedia Foundation, Inc., https://en.wikipedia.org/wiki/Non-fungible_token, Retrieved on Jan. 2, 2023.
"SpaceBridge: Pioneering Payments in Space," https://www.jpmorgan.com/onyx/payments-in-space.htm, JP Morgan Chase and Co., Retrieved on Dec. 16, 2022.

\* cited by examiner

SATELLITE DATA NFT TRANSFER LEVERAGING BLOCKCHAIN AND SMART CONTRACT CAPABILITIES

FIELD OF TECHNOLOGY

Aspects of the disclosure relate to leveraging satellites to transfer and execute transactions.

BACKGROUND OF THE DISCLOSURE

Electronic communication and network connection between devices and networks are generally enabled via ground-based communication channels, i.e.—optical fibers. The space industry is increasing the use of low-orbit satellites for electronic communication and navigation. As such, in circumstances where ground-based communication channels may not be available and/or in circumstances where an even quicker delivery is essential, using low-orbit satellites for transmission may be an optimal choice. It would be desirable, therefore, to leverage low-orbit satellites when default communication pathways may not be enabled.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A method for establishing an alternative transaction gateway when a default transaction network is down may be provided. The alternative transaction gateway may leverage a network of low-orbit satellites. The network of low-orbit satellites may be a part of an entity network. The network of low-orbit satellites may be in electronic communication with one another.

An alternative transaction gateway may be implemented when the default transaction network may not be established. The implementation may be triggered following a natural disaster, construction, war and/or any other suitable occurrence.

It should be appreciated that the speed of transmission of electronic communications via satellites may be at least sixty percent faster than on the ground.

The method may include creating a non-fungible token ("NFT") using a first internet of things ("IoT") device. The NFT may be a unique identifiable digital item representing the transaction. The NFT may be tied to the ownership of the first IoT device.

An IoT device for the purposes of the disclosure may include an automated teller machine ("ATM"), a smartphone, a Point-of-sale ("POS") device and any other suitable smart device.

The NFT may include transaction data associated with a transaction executed at the IoT device. The NFT may also include a geo-location of the first IoT device.

The NFT may include an ownership of the first IoT device. Ownership of the first IoT device may include an identifier identifying the first IoT device.

Because NFT includes embedded ownership identifying data, the entity associated with the transaction may be enabled to trace ownership of the IoT device and the customer who initiated the transaction via the satellite(s).

When the first IoT device is a smartphone, the ownership of the first IoT device may be hardware identifier of the smartphone, a unique ID of the smartphone. The ownership of the first IoT device may also include a name of the user of the smartphone.

When the first IoT device is an ATM, the ownership of the first IoT device may include a hardware identifier of the ATM, an ATM ID number. The ownership may also include an ID of the entity responsible for the ATM.

The NFT may include transaction data associated with the transaction. Transaction data may include a name of the entity performing the transaction. Transaction data may include a name of a recipient of the transaction. The transaction data may include check images that may be included in the transaction. The transaction data may also include a timestamp of the time the transaction was initiated.

In some embodiments, the NFT may also include a phone number associated with the first IoT device, when the first IoT device is a smartphone.

An IoT device, in accordance with principles of the disclosure, may include but may not be limited to one of, a POS device, ATM and smartphone.

The method may further include storing the NFT, via the first IoT device, at the first IoT device pending proximity to a satellite antenna. In some embodiments the satellite antenna may be situated in close proximity to the first IoT device. In some embodiments the satellite antenna may be situated at another IoT device.

The method may also include receiving the NFT, via a second IoT device, from the first IoT device. The receiving may be performed when the first IoT device is within proximity to the second IoT device and a pairing of the two devices may be enabled. The second IoT device may be hosting the satellite antenna.

Upon receipt of the NFT at the second IoT device, the method may further include, adding to the NFT, second IoT device identifying data. Second IoT device identifying data may include an ownership of the second IoT device. The ownership may include an identifier identifying the second IoT device.

It should be appreciated that adding identifying data associated with the second IoT device to the NFT further increases the non-fungibility of the token.

When the second IoT device is a smartphone, the ownership of the second IoT device may be a hardware identifier of the smartphone and/or a unique ID of the smartphone. The ownership of the second IoT device may also include a name of the user of the smartphone.

When the second IoT device is an ATM, the ownership of the second IoT device may include a hardware identifier of the ATM and/or an ATM ID number. The ownership may also include an ID of the entity associated with the ATM.

The method may further include transmitting the NFT, via the second IoT device to a first low-orbit satellite when the first low-orbit satellite is within a first pre-determined proximity to the second IoT device. The first low-orbit satellite may be a from a network of low-orbit satellites. The first pre-determined proximity may be a proximity that enables an earth-based IoT device to establish an electronic communication with a low-orbit satellite.

The entity network may be pre-registered with the network of low-orbit satellites for leveraging this network of low-orbit satellites as an alternative gateway for processing transactions at the centralized server.

The method may also include, when within the pre-determined proximity to the second IoT device, receiving the NFT from the second IoT device.

The method may further include, following receipt of the NFT, running a smart contract stored at the first low-orbit satellite. The smart contract may be executed in order to identify a pathway for transporting the NFT. The pathway may include one or more additional low-orbit satellites from the network of low-orbit satellites to operate as carriers for the NFT to the centralized server.

A smart contract, for purposes of the disclosure, may be a program(s) stored on a blockchain that may run when predetermined conditions are met. The smart contract may also automate a workflow, triggering the next action when conditions are met. Because smart contracts are digital and automated, once a condition is met, the contract may be executed immediately.

The method may further include, reserving, via the smart contract at the first low-orbit satellite, the one or more additional low-orbit satellites identified for the pathway for transporting the NFT.

In some embodiments, the method may also include optimizing the pathway, via the smart contract at the first low-orbit satellite, based on a transaction type associated with the transaction data embedded in the NFT.

The transaction type may include one of a low-value transaction, high-value transaction, a time-sensitive transaction, claims settlement transaction and a refund transaction.

When the transaction type is time-sensitive, the method may include selecting, via the smart contract, a one or more additional low-orbit satellites from within the network of low-orbit satellites that enables a quickest transmission of the NFT to the central server.

The first low-orbit satellite may also be configured for adding to the NFT, first low-orbit satellite data. First low-orbit satellite data may include a unique identifier of the first low-orbit satellite. First low-orbit satellite data may also include a unique hardware identifier of the satellite. Adding first low-orbit satellite data to the NFT further increases the non-fungibility of the token.

The first low-orbit satellite may further be configured for storing a copy of the NFT in a first satellite blockchain distributed ledger and transmitting the NFT to the second low-orbit satellite.

The second low-orbit satellite may also be from the network of low-orbit satellites. The second low-orbit satellite may be configured for receiving the NFT from the first low-orbit satellite. Following receipt of the NFT, the second low-orbit satellite may also be configured for adding to the NFT, second low-orbit satellite data. The second low-orbit satellite may further be configured for storing a copy of the NFT in a second satellite blockchain distributed ledger.

It should be appreciated that the first low-orbit satellite and the second low-orbit satellite may be pre-registered with the entity network associated with the centralized server.

When within a second pre-determined proximity to the centralized server, the second low-orbit satellite may further be configured for transmitting the NFT to the centralized server.

The centralized server may include a satellite antenna. In some embodiments, the centralized server may be within close proximity to the satellite antenna. The centralized server may be configured for receiving the NFT from the second low-orbit satellite. The centralized server may further be configured for processing the transaction data embedded in the NFT.

The centralized server may further be configured for transferring the NFT to an earth-based distributed ledger. The earth-based distributed ledger may be synchronized with the distributed ledgers at each of the low-orbit satellites within the network of satellites.

Following a lapse of a pre-determined amount of time, the first low-orbit satellite may be configured for, deleting the NFT from the first satellite blockchain distributed ledger. The second low-orbit satellite may also be configured for, following the lapse of the pre-determined amount of time, deleting the NFT from the second satellite blockchain distributed ledger.

In some embodiments, following the transmitting of the NFT from the first low-orbit satellite to the second low-orbit satellite, the method may include deleting the NFT from the first satellite blockchain distributed ledger, via the first low-orbit satellite.

In some embodiments, following the transmitting of the NFT from the second low-orbit satellite to the centralized server, the method may include deleting the NFT, via the second satellite blockchain distributed ledger, from the second low-orbit satellite database.

It should be appreciated that each entry into the first satellite blockchain distributed ledger and the second satellite blockchain distributed ledger may be broadcast as blocks in the earth-based blockchain distributed ledger. The first satellite blockchain distributed ledger, the second satellite blockchain distributed ledger and the earth-based blockchain distributed ledger may be synchronized with one another.

In some embodiments the NFT may be a first NFT. When the NFT is a first NFT, the method may further include receiving, using the second IoT device a second NFT and a third NFT. The method may also include creating, using the second IoT device, a cluster of NFT's. The cluster of NFT's may include the first NFT, the second NFT and the third NFT.

When the first low-orbit satellite is within the first pre-determined proximity to the second IoT device, the method may include transmitting the cluster of NFT's to the first low-orbit satellite using the second IoT device.

When the first low-orbit satellite is within the first pre-determined proximity to the second IoT device, the method may include receiving, via the first low-orbit satellite, the cluster of NFT's from the second IoT device. The method may also include identifying the pathway, via the smart contract, for each of the first NFT, the second NFT and the third NFT.

A method for establishing an alternative transaction gateway when a default transaction network is down is provided. The method may implement the alternative transaction gateway by leveraging a network of low-orbit satellites. Each low-orbit satellite within the network of low-orbit satellites may operate as an authentic node. Each authentic node may be configured to maintain a space-based blockchain distributed ledger.

It should be appreciated that each authentic node may be authenticated by an entity network associated with the centralized server prior to being added to the network of low-orbit satellites.

The method may include creating, via a first IoT device, an NFT. The NFT may include transaction data associated with a transaction executed at the first IoT device.

The NFT may include a geo-location of the first IoT device, an ownership of the first IoT device and transaction data. The transaction data may include an account associated with the user initiating the transaction. The transaction data may include an account associated with a recipient of the transaction. The transaction data may include check images that may be included in the transaction. The transaction data may also include a timestamp of the time the transaction was initiated.

The method may include storing, via the first IoT device, the NFT at the first IoT device pending proximity to a satellite antenna.

The method may also include receiving, via a second IoT device hosting the satellite antenna, the NFT from the first IoT device.

The method may further include transmitting the NFT, via the second IoT device, to a first low-orbit satellite when the first low-orbit satellite is within a first pre-determined proximity to the second IoT device. The first pre-determined proximity may be a distance between the low-orbit satellite and the satellite antenna that enables electronic communication. The first low-orbit satellite may be from the network of low-orbit satellites.

When the first low-orbit satellite is within the first pre-determined proximity to the second IoT device, the method may include receiving, via the second IoT device, the NFT from the second IoT device.

In some embodiments, the NFT may only be created when the first low-orbit satellite is within the first pre-determined proximity to the satellite antenna.

When the first low-orbit satellite is within the first pre-determined proximity to the satellite antenna, the first low-orbit satellite may pick up a signal from the satellite antenna and the second IoT device and the first low-orbit satellite may be paired.

In response to the pairing of the first low-orbit satellite and the second IoT device, the smart contract may be executed. In response to the execution of the smart contract, the NFT may be created at the second IoT device. The smart contract may be configured to determine identifying data of the second IoT device, the transaction data, the satellite identification data and embed it all into the NFT.

The first IoT device may store the transaction data associated with the transaction initiated at the first IoT device pending the creation of the NFT. Once the NFT is created and the transaction data is included in the NFT, the transaction data may be deleted from the first IoT device.

The method may further include running, via the first low-orbit satellite, the smart contract stored at the first low-orbit satellite. The smart contract may be protocol to identify a pathway for transporting the NFT. The smart contract may include protocol defined between the entity network, the IoT device and the low-orbit satellite network.

The pathway may include one or more additional low-orbit satellites from the network of low-orbit satellites operating as carriers for the NFT to a centralized server.

The smart contract protocol may include determining a transaction type associated with the transaction associated with the NFT. The smart contract protocol may include determining a priority level for the transaction based on the transaction type. The smart contract protocol may include parameters for managing the data included in the NFT. The smart contract may include protocol for creating the pathway of satellites transmitting the NFT.

The smart contract may include protocol for determining a priority level of the NFT. The priority level may be a priority of the transaction associated with the NFT. The priority level may be the priority of the NFT in comparison to a plurality of NFT's awaiting transmission to the centralized server.

The method may further include adding to the NFT, via the first low-orbit satellite, first low-orbit satellite data.

The method may further include storing, via the first low-orbit satellite, a copy of the NFT at the first low-orbit satellite and transmitting the NFT, via the first low-orbit satellite, to a second low-orbit satellite.

The method may further include receiving the NFT from the first low-orbit satellite, using a second low-orbit satellite, the second low-orbit satellite from the network of low-orbit satellites.

The method may also include adding to the NFT, using the second low-orbit satellite, second low-orbit satellite data.

The method may further include storing a copy of the NFT at the second low-orbit satellite, using the second low-orbit satellite.

The method may further include prior to transmitting the NFT to the centralized server, adding to the space-based blockchain, using the second low-orbit satellite, a block comprising the NFT and broadcasting the block, using the second low-orbit satellite, to the first low-orbit satellite.

When within a second pre-determined proximity to the centralized server, the method may include transmitting the NFT to the centralized server via the second low-orbit satellite. The centralized server may include a satellite antenna for receiving the NFT from the low-orbit satellite.

The method may further include receiving the NFT, via the centralized server.

Following a receipt of the NFT, the method may include processing the transaction data via the centralized server and updating an earth-based blockchain, via the centralized server, with a block comprising the NFT.

In some embodiments the space-based blockchain distributed ledger may be in synchronization with the earth-based blockchain distributed ledger.

The method may further include following the receiving of the NFT at the second low-orbit satellite, deleting the NFT from the first low-orbit satellite.

It should be appreciated that in some embodiments the pathway for hopping of the NFT from the IoT device to the centralized server may not be limited to only one or two low-orbit satellites. In some embodiments the pathway may include three, four, five or more low-orbit satellites as carriers for one NFT and/or a cluster of NFT's to the centralized server.

In some embodiments, a system for establishing an alternative transaction gateway when a default transaction network is down may be provided. The alternative transaction gateway may leverage a network of low-orbit satellites.

The system may include an IoT device. The IoT device may be configured to create an NFT. The NFT may be associated with a transaction executed at the IoT device. The NFT may include a geo-location of the IoT device. The NFT may include an ownership of the IoT device. The NFT may include transaction data.

The IoT device may be configured to store the NFT at the IoT device pending proximity to a first low-orbit satellite.

When the first low-orbit satellite is within a first pre-determined proximity to the IoT device, the IoT device may be configured transmit the NFT to the first low-orbit satellite. The first low-orbit satellite may be from the network of low-orbit satellites. The IoT device may be configured to transmit the NFT via the satellite antenna that may be positioned at the IoT device and/or in close proximity to the IoT device.

The IoT device may be one of, but not limited to, an ATM, a smartphone, a handheld scanning device i.e.—point of sale ("POS") device.

The first low-orbit satellite, when within the first pre-determined proximity to the IoT device, may be configured to receive the NFT from the IoT device. Following the receipt of the NFT, the first low-orbit satellite may be configured to run a smart contract stored at the first low-orbit satellite to identify a pathway for transporting the NFT.

The pathway may include one or more additional low-orbit satellites from the network of low-orbit satellites operating as carriers for the NFT to a centralized server.

The first low-orbit satellite may be configured to add to the NFT, first low-orbit satellite data.

The first low-orbit satellite may be configured to store a copy of the NFT in a first satellite blockchain distributed ledger.

The first low-orbit satellite may be configured to transmit the NFT to a second low-orbit satellite.

The second low-orbit satellite, from the network of low-orbit satellites, may be configured to receive the NFT from the first low-orbit satellite. The second low-orbit satellite may further be configured to add to the NFT, second low-orbit satellite data.

The second low-orbit satellite may further be configured to store a copy of the NFT in a second satellite blockchain distributed ledger.

When within a second pre-determined proximity to the centralized server, the second low-orbit satellite may be configured to transmit the NFT to the centralized server. The centralized server may include a satellite antenna. The centralized server may be configured to receive the NFT from the second low-orbit satellite, process the transaction data and transfer the NFT to an earth-based blockchain distributed ledger.

The first low-orbit satellite may be configured to, following a lapse of a pre-determined amount of time, delete the NFT from the first satellite blockchain distributed ledger. The second low-orbit satellite may be configured to, following the lapse of the pre-determined amount of time, delete the NFT from the second satellite blockchain distributed ledger.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
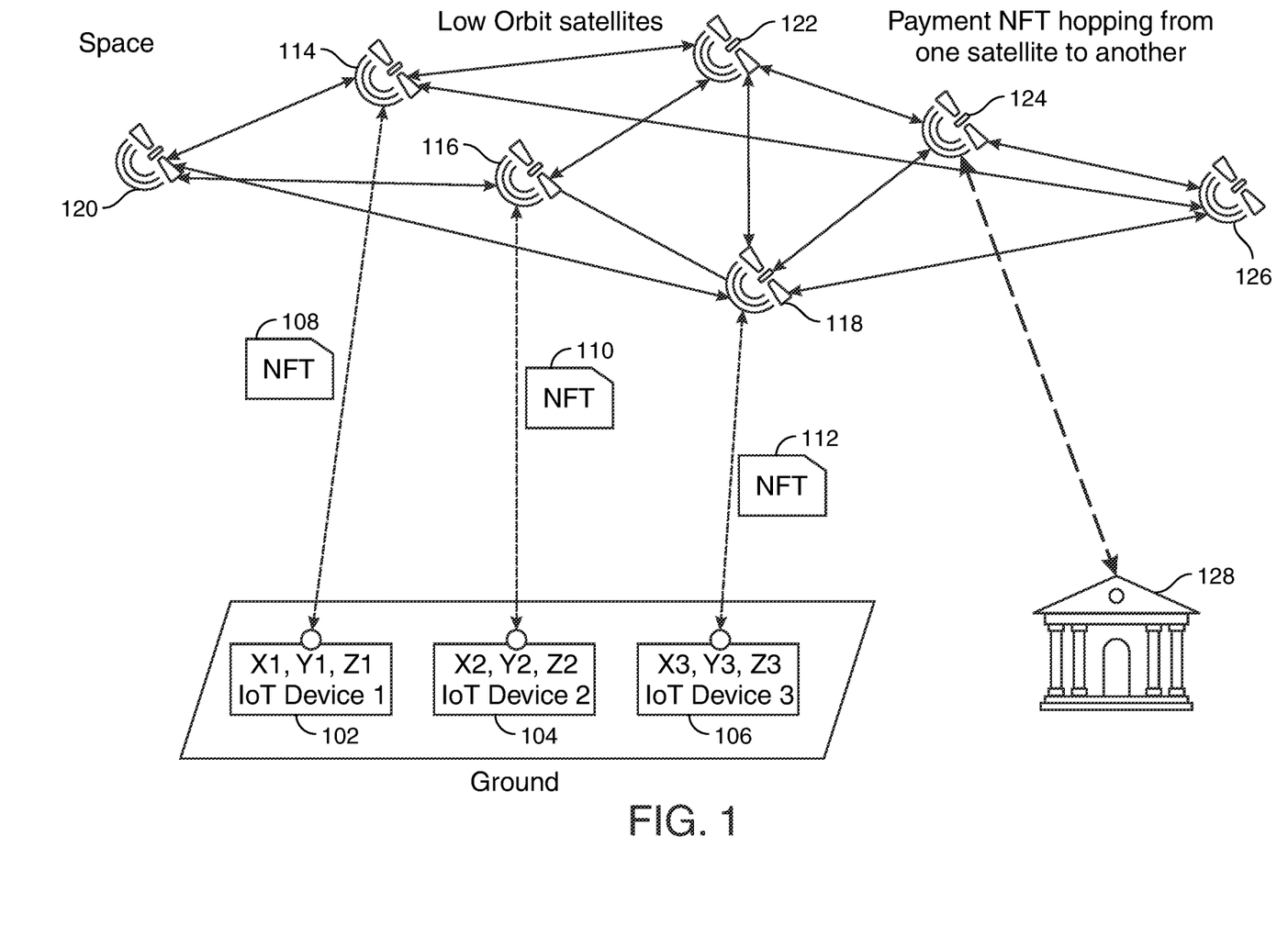
FIG. 1 shows an illustrative diagram in accordance with principles of the disclosure.

FIG. 1 shows an illustrative diagram of a transaction being transported to a central server using an alternative pathway. In this illustrative diagram the alternative pathway leverages low-orbit satellites. The low-orbit satellites may be a part of a low-orbit satellite network.

IoT device 1, at 102, may be positioned at ground-based coordinate x1, y1, z1. IoT device 1, at 102, may include a pending transaction executed at IoT device 1. The transaction data may be stored in NFT 108. NFT 108 may include a unique data set generated for the pending transaction that includes the transaction data and an identifier associated with IoT device 1.

IoT device 2, at 104, may be positioned at ground-based coordinate x2, y2, z2. IoT device 2, at 104, may also include a pending transaction executed at IoT device 2. The transaction data may be stored in NFT 110. NFT 110 may include a unique data set generated for the pending transaction that includes the transaction data and an identifier associated with IoT device 2.

IoT device 3, at 106, may be positioned at ground-based coordinate x3, y3, z3. IoT device 3, at 106, may also include a pending transaction executed at IoT device 3. The transaction data associated with the pending transaction may be stored in NFT 112. NFT 112 may include a unique data set generated for the pending transaction that includes the transaction data and an identifier associated with IoT device 3.

IoT device 1, at 102, may be enabled to pair with satellite 114 via a satellite antenna at the IoT device 1 when satellite 114 is within close proximity to IoT device 1. When pairing is established, IoT device 1 and satellite 114 may be enabled to be in electronic communication. NFT 108 may be transmitted to satellite 114. NFT 108 may be retrieved by satellite 114.

At satellite 114, a smart contract may be generated and define an optimal pathway for NFT 108 to be transmitted to central server. The optimal pathway may include any one or more of satellites 114-126.

IoT device 2, at 104, may be enabled to pair with satellite 116 via a satellite antenna at IoT device 2 when satellite 116 is within close proximity to IoT device 2. When pairing is established, IoT device 2 and satellite 116 may be enabled to be in electronic communication. NFT 110 may be transmitted to satellite 116. NFT 110 may be retrieved by satellite 116.

At satellite 116, a smart contract may be generated and define an optimal pathway for NFT 110 to be transmitted to central server 128. The optimal pathway may include any one or more of satellites 114-126.

IoT device 3, at 106, may be enabled to pair with satellite 118 via a satellite antenna at IoT device 3 when satellite 118 is within close proximity to IoT device 3. When pairing is established, IoT device 3 and satellite 118 may be enabled to be in electronic communication. NFT 112 may be transmitted to satellite 118. NFT 112 may be retrieved by satellite 118.

It should be appreciated that when any one of IoT devices 102, 104 and 106 do not have a satellite antenna, the IoT device may transmit the NFT to another IoT device that may include a satellite antenna.

Each of low-orbit satellites 114, 116, 118, 120, 122, 124 and 126 may be enabled to carry one, two, three or more NFT's to the centralized server 128. When an NFT is transmitted to a satellite, the satellite may execute a load balancing algorithm to coordinate delivery of each NFT based on priority, size and any other suitable specifications.

Figure 2:
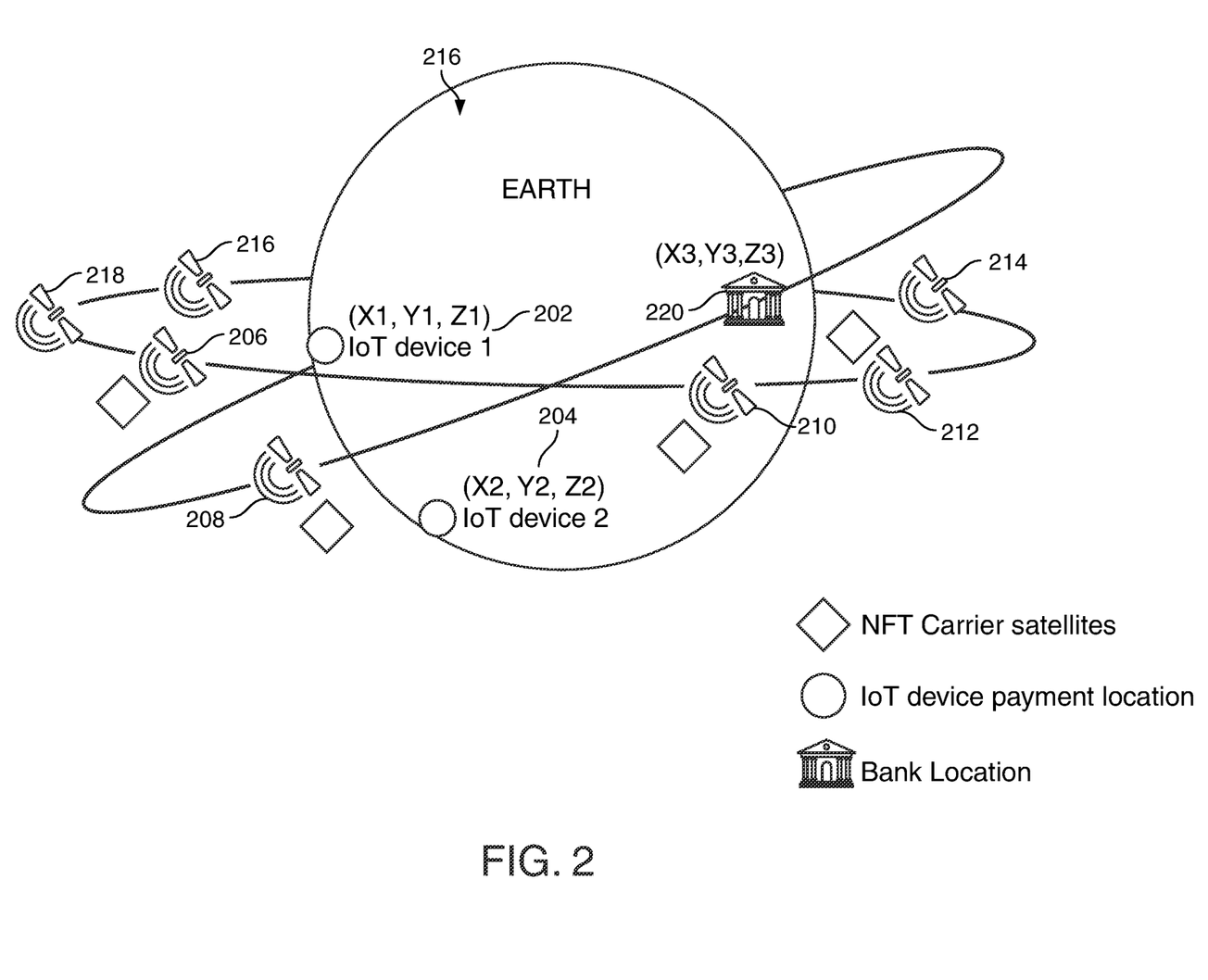
FIG. 2 shows an illustrative diagram in accordance with principles of the disclosure.

FIG. 2 shows an illustrative diagram of a first IoT device 202 and a second IoT device 204 positioned in two separate locations within earth 222. IoT device 202 may be positioned at coordinate 'x1, y1, z1.' IoT device 204 may be positioned at coordinate 'x2, y2, z2.'

Satellites 206, 208, 210, 212, 214, 216 and 218 are orbiting around earth 222.

IoT device 202 and 204 may have one or more NFT's awaiting transmission to central server 220. IoT device 202 and IoT device 204 may initiate electronic communication with any one of the satellites 206-218 that may reach a location that is within a close proximity to the IoT device.

In this illustrative diagram, some of the satellites may be carrying NFT's and some of the satellites may not be carrying NFT's.

Each NFT generated at IoT device 202 and/or IoT device 204 may hop through one or more of satellites 206-218 in order to reach destination 220.

It should be appreciated that when a satellite is not carrying an NFT, the satellite may still be operating as an authentic node in the blockchain network.

Figure 3:
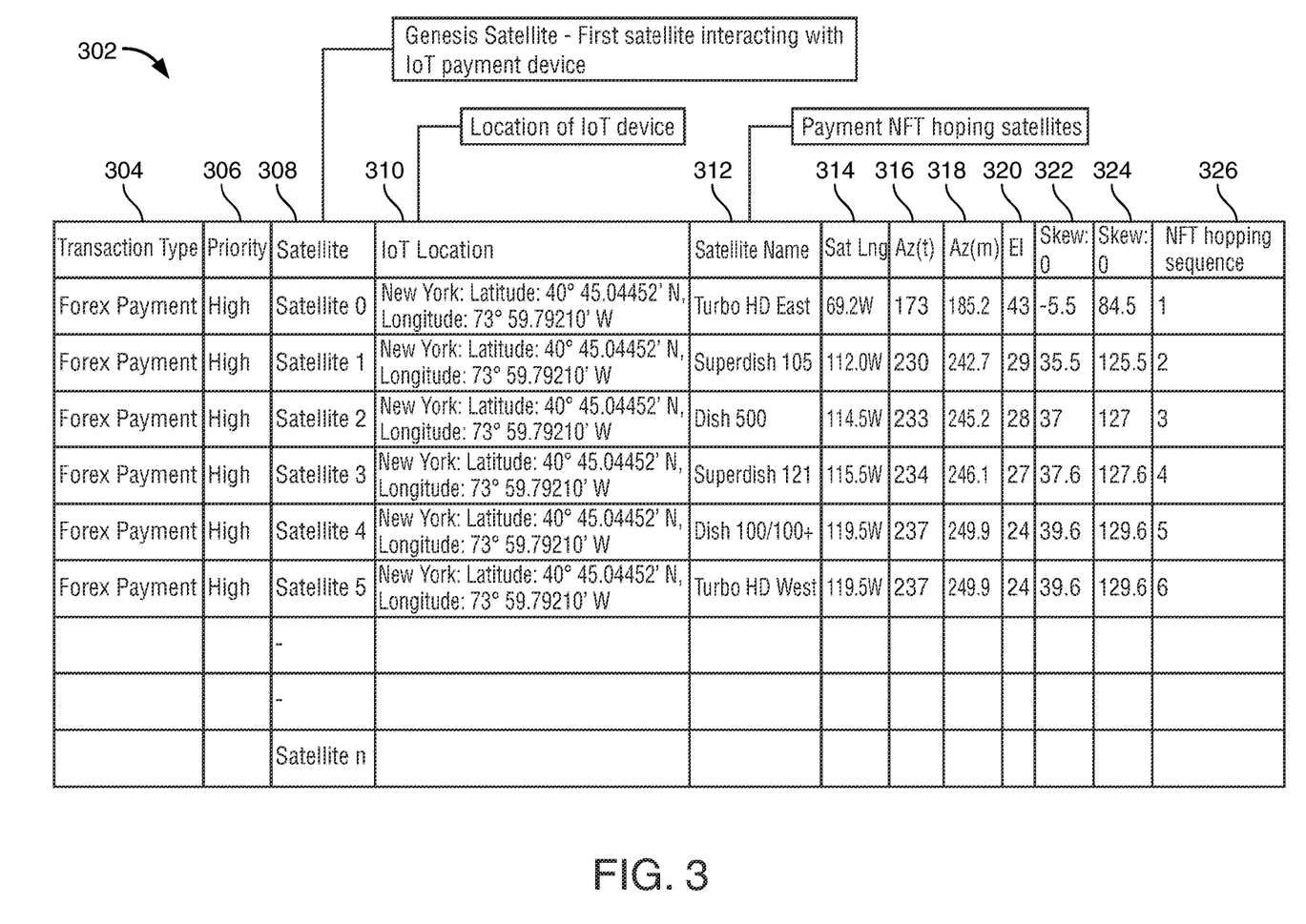
FIG. 3 shows an illustrative diagram in accordance with principles of the disclosure.

FIG. 3 shows an illustrative table 302 representing an exemplary satellite sequence for an NFT.

For the NFT, column 304 may represent the transaction type associated with the NFT. Column 306 may represent the priority level for transmittal of the NFT to the central server.

The transaction type for each NFT in this illustrative diagram may be a forex payment. Because forex payments are time-sensitive, the priority may be set to a high(est) priority. At priority column 306, the priority for each transaction type is set to 'high.'

Column 308 may represent the satellite number within the sequence of hopping of the NFT.

Column 310 may represent the IoT location where the NFT is generated prior to transmittal to the first satellite. Column 312 may represent the satellite name.

Column 314 may represent the geographical longitude of the satellite.

Column 316 may represent the true-north azimuthal angle for the satellite.

Column 318 may represent the magnetic-north azimuthal angle for the satellite.

Column 320 may be the elevation angle in degrees.

Columns 322 and 324 may represent the dishes that pick up more than one satellite. These dishes may be rotated along their aiming axis (skewed) to accommodate the relationship between local horizontal and the relative tilt of the geostationary orbit at the chosen location.

Column 326 may represent the NFT hopping sequence. This may be the order of satellites in which the NFT is travelling.

As shown at column 310, satellites 0-5 may be a part of the pathway for the NFT to travel from the IoT device to the central server. In some embodiments, the NFT may hop from satellite 0-5 and then to the central server. In some embodiments, the NFT may be transported via a number of additional satellites, aside from satellites 0-5, in order to reach the central server.

Figure 4:
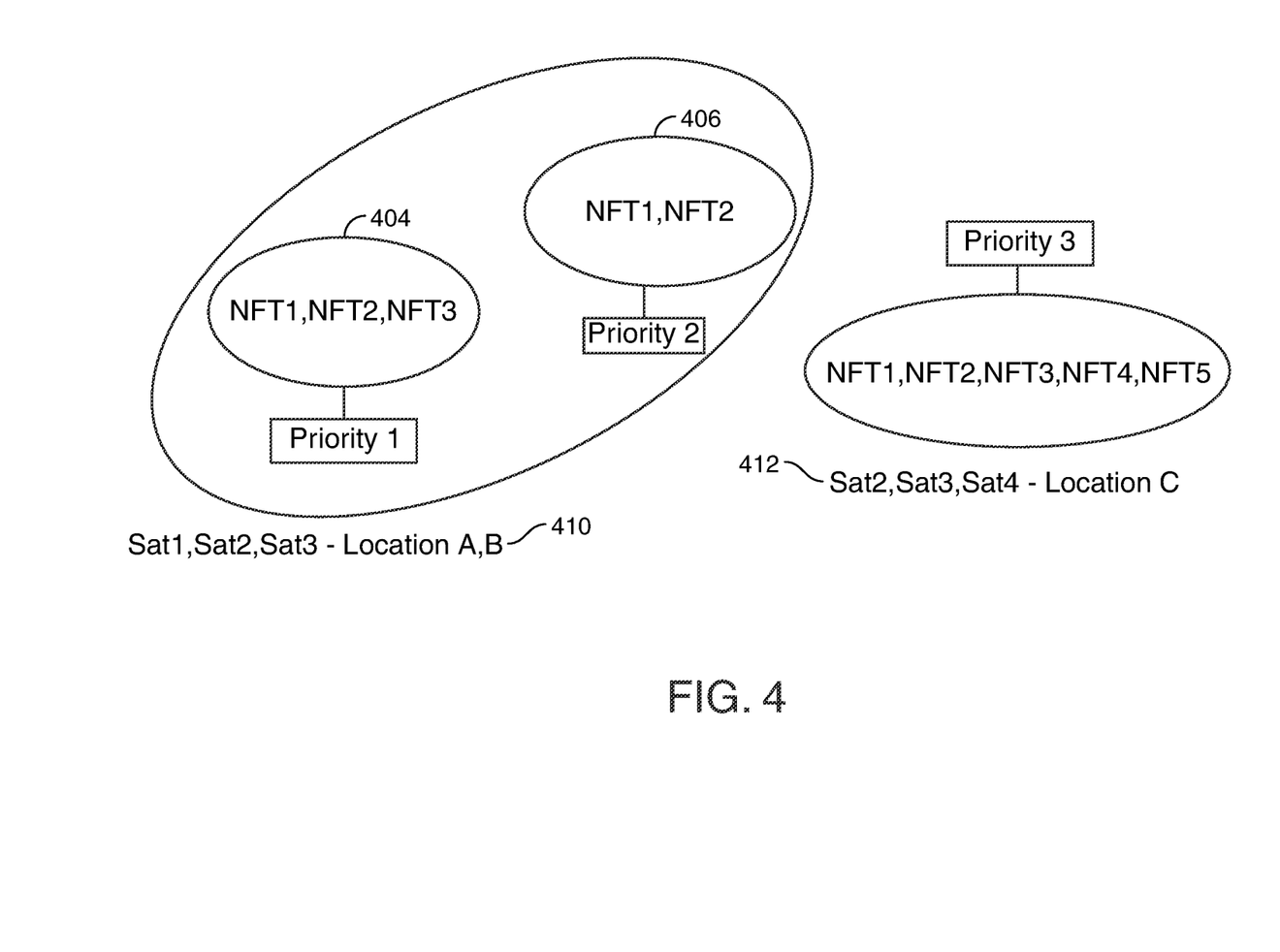
FIG. 4 shows an illustrative diagram in accordance with principles of the disclosure.

FIG. 4 shows an illustrative diagram of clustering NFT's based on priority. NFT's may be clustered that may be similar in transaction type and that are generated at locations with common ground proximity.

When two or three geolocations of IoT devices have common ground proximity, one satellite may be enabled to cluster all NFT's at each of the IoT devices based on the priority of the transaction associated with the NFT. Each cluster may have a customized hopping sequence.

Priority may be defined by transaction type including a low-value payment transaction, high-value payment transaction, forex trading, urgency, claims settlement and refund transactions.

NFT 1, NFT 2 and NFT 3, shown at 404, may be a cluster of NFT's generated by one or more IoT devices that are in close proximity to each other. Cluster 404 may include NFT's with a first priority. The first priority may be the highest priority.

NFT 4 and NFT 5, shown at 406, may be another cluster of NFT's generated by one or more IoT devices that are in close proximity to each other. Cluster 406 may include NFT's with a second priority level. The second priority level may be lower than the priority level of cluster 404.

Both cluster 404 and cluster 406 may be in close proximity to one or more satellite antenna's for transmission to a low-orbit satellite. Location A, B may be the location where cluster 404 and cluster 406 may be positioned. Clusters 404 and 406 may be transmitted through a pathway including one or more of satellites 1, satellite 2 and satellite 3, shown at 410.

The satellite hopping sequence, in some embodiments, may be the same satellite hopping sequence for both clusters 404 and 406. In some embodiments, the satellite hopping sequence cluster 404 may be different than the satellite hopping sequence for cluster 406.

A third cluster of NFT's may be shown at 408. Cluster 408 may include NFT 6, NFT 7, NFT 8, NFT 9 and NFT 10. Cluster 408 may include NFT's with a third priority level. Cluster 408 may have a pathway for hopping that includes one or more of satellite 2, satellite 3 and satellite 4, as shown at 412.

Figure 5:
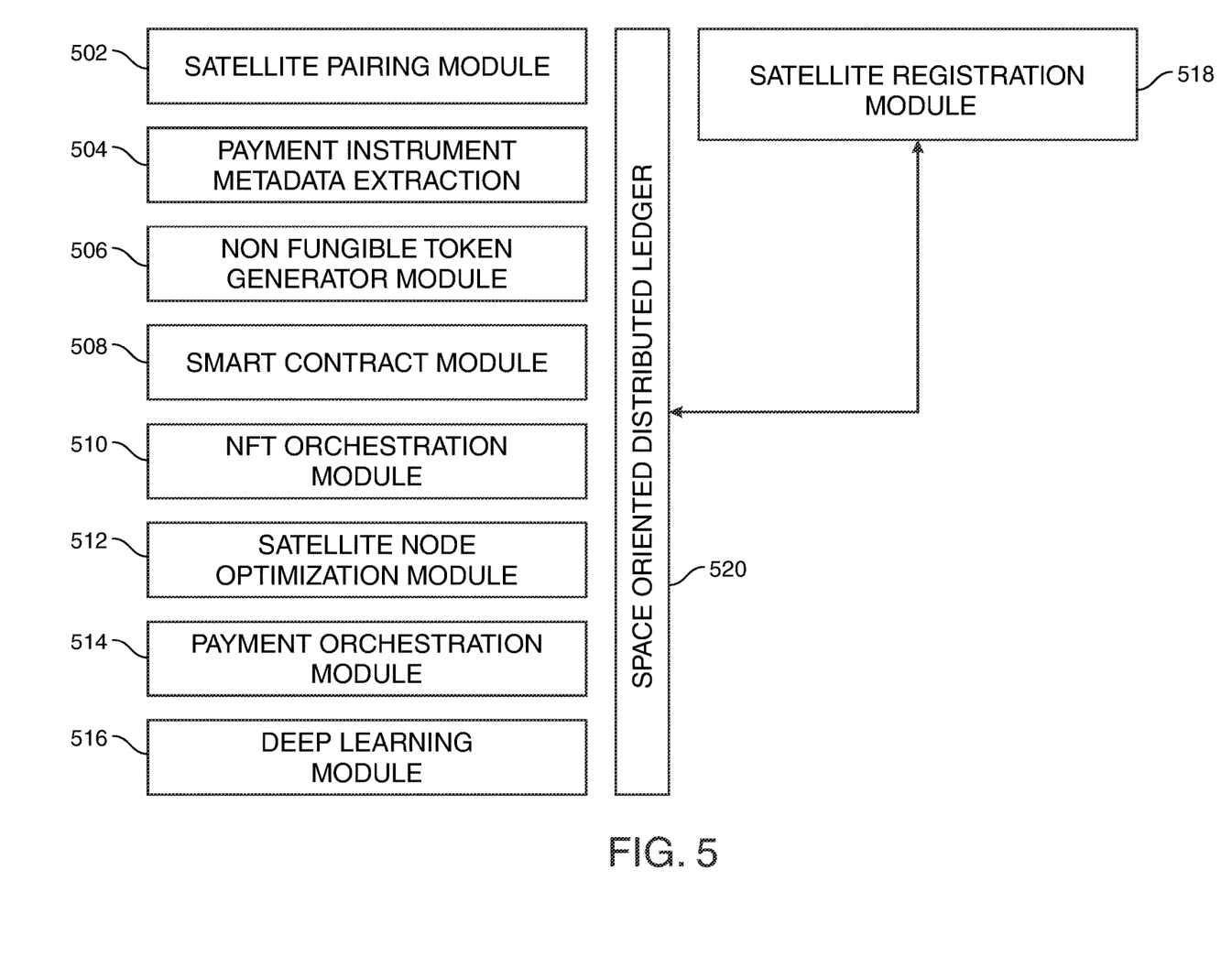
FIG. 5 shows an illustrative diagram in accordance with principles of the disclosure.

FIG. 5 shows an illustrative flow diagram of the applications executed within the systems and methods for leveraging low-orbit satellites to transmit transactions to a central server in accordance with principles of the disclosure.

Satellite pairing module 502 may be an application at either the genesis satellite or the IoT device holding the NFT. Satellite pairing module 502 may initiate the pairing between the IoT device and the genesis satellite.

Payment instrument metadata extraction module 504 may be an application executed at the IoT device for extracting metadata associated with the IoT device where the transaction is executed. Metadata associated with the IoT device may be stored in the NFT.

Non-fungible token generator module 506 may be an application at the IoT device for generating the NFT for each transaction.

Smart contract module 508 may be managing the activity at the IoT device(s) and communication with the satellite(s) for creating a pathway for the NFT to reach the centralized server.

NFT orchestration module 510 may be a module for managing the creation of the NFT and control the traversing of NFT on the low-orbit satellites and for further finalizing the validation at the centralized server.

NFT orchestration module 510 may be a module for orchestrating a creation of the NFT as part of the blockchain. In some embodiments the NFT is created at the IoT device. In some embodiments, the NFT is created at the first low-orbit satellite and the data is extracted from the first and/or second IoT device.

Satellite node optimization module 512 may be a module for optimizing the pathway of low-orbit satellites for carrying the NFT to the centralized server.

Payment orchestration module 514 may be a module for, based on entity network standards, may execute the settling of the transaction associated with the NFT.

Deep learning module 516 may be an artificial intelligence ("AI") model which may perform load balancing on each satellite. The deep learning module may also use AI to determine which is the nearest satellites for carrying the NFT and the amount of storage space available at each satellite.

Space oriented distributed ledger 520 may be a distributed network of nodes in space created by low orbiting satellites in order to construct a blockchain network. This blockchain network may be synchronized with the ground-based network.

It should be appreciated that the satellite registration process may be executed on the blockchain network itself.

Satellite registration module 518 may be a module that may register each satellite to the satellite network so that the entity associated with the centralized server may be enabled to leverage these satellites for NFT storage and hopping. Once a satellite is registered, the entity network may use these satellites for temporary NFT storage and/or as an authentic node for the blockchain.

Figure 6:
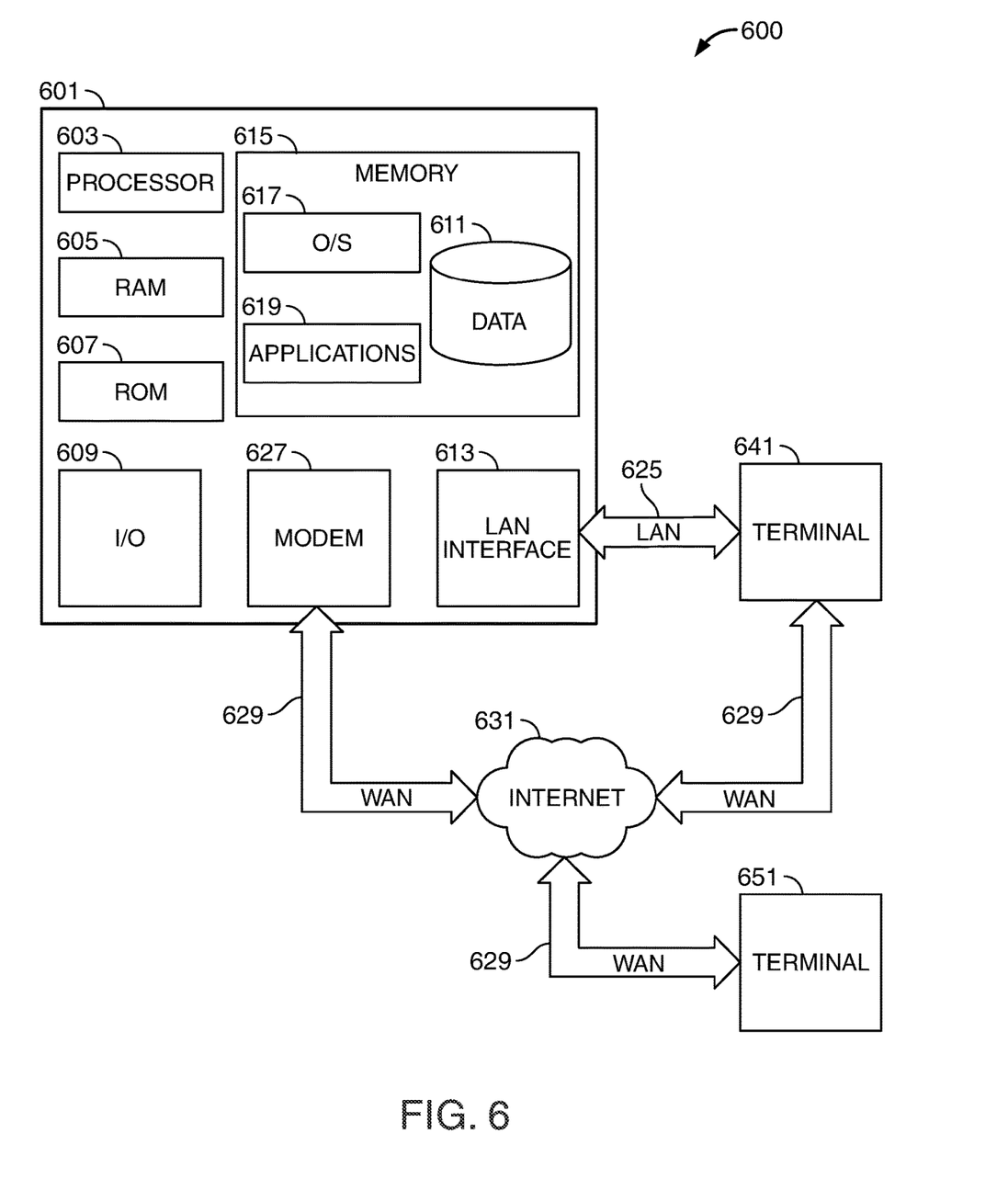
FIG. 6 shows an illustrative block diagram in accordance with principles of the disclosure.

FIG. 6 shows illustrative apparatus 600 that may be configured in accordance with the principles of the invention. FIG. 6 is a block diagram that illustrates a computing device 601 (alternatively referred to herein as a "server or computer") that may be used in accordance with the principles of the invention. The computer device 601 may have a processor 603 for controlling overall operation of the server and its associated components, including RAM 605, ROM 607, input/output ("I/O") module 609, and memory 615. One or more of the first IoT device, the second IoT device, the satellite(s), the central server, and other apparatus referenced in the application, may have one or more features of computing device 601 described herein.

I/O module 609 may include a microphone, keypad, touch-sensitive screen and/or stylus through which a user of device 601 may provide input and may also include one or more of a speaker for providing audio output and a video display device for providing textual, audiovisual and/or graphical output. Software may be stored within memory 615 and/or other storage (not shown) to provide instructions to processor 603 for enabling server 601 to perform various functions. For example, memory 615 may store software used by server 601, such as an operating system 617, application programs 619, and an associated database.

Alternatively, some or all of computer executable instructions of server 601 may be embodied in hardware or firmware (not shown).

Server 601 may operate in a networked environment supporting connections to one or more remote computers, such as terminals 641 and 651. Terminals 641 and 651 may be personal computers or servers that include many or all of the elements described above relative to server 601. The network connections depicted in FIG. 6 include a local area network (LAN) 625 and a wide area network (WAN) 629 but may also include other networks.

When used in a LAN networking environment, computer 601 is connected to LAN 625 through a network interface or adapter 613.

When used in a WAN networking environment, server 601 may include a modem 627 or other means for establishing communications over WAN 629, such as Internet 631.

It will be appreciated that the network connections shown are illustrative and other means of establishing a communications link between the computers may be used. The existence of any of various well-known protocols such as TCP/IP, Ethernet, FTP, HTTP, and the like is presumed, and the system may be operated in a client-server configuration to permit a user to retrieve web pages from a web-based server. Any of various conventional web browsers may be used to display and manipulate data on web pages.

Additionally, application program 619, which may be used by server 601, may include computer executable instructions for invoking user functionality related to communication, such as email, short message service (SMS), authentication services and voice input and speech recognition applications.

Computing device 601 and/or terminals 641 or 651 may also be mobile terminals including various other components, such as a battery, speaker, and antennas (not shown). Terminal 651 and/or terminal 641 may be portable devices such as a laptop, tablet, smartphone, or any other suitable device for receiving, storing, transmitting and/or displaying relevant information.

Any information described above in connection with database 611, and any other suitable information, may be stored in memory 615. One or more of applications 619 may include one or more algorithms that encrypt information, process received executable instructions, interact with enterprise systems, perform power management routines or other suitable tasks. Algorithms may be used to perform the functions of creating the optimal pathway for each NFT, determining closest proximity to a satellite antenna, load balancing at each low-orbit satellite and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 7:
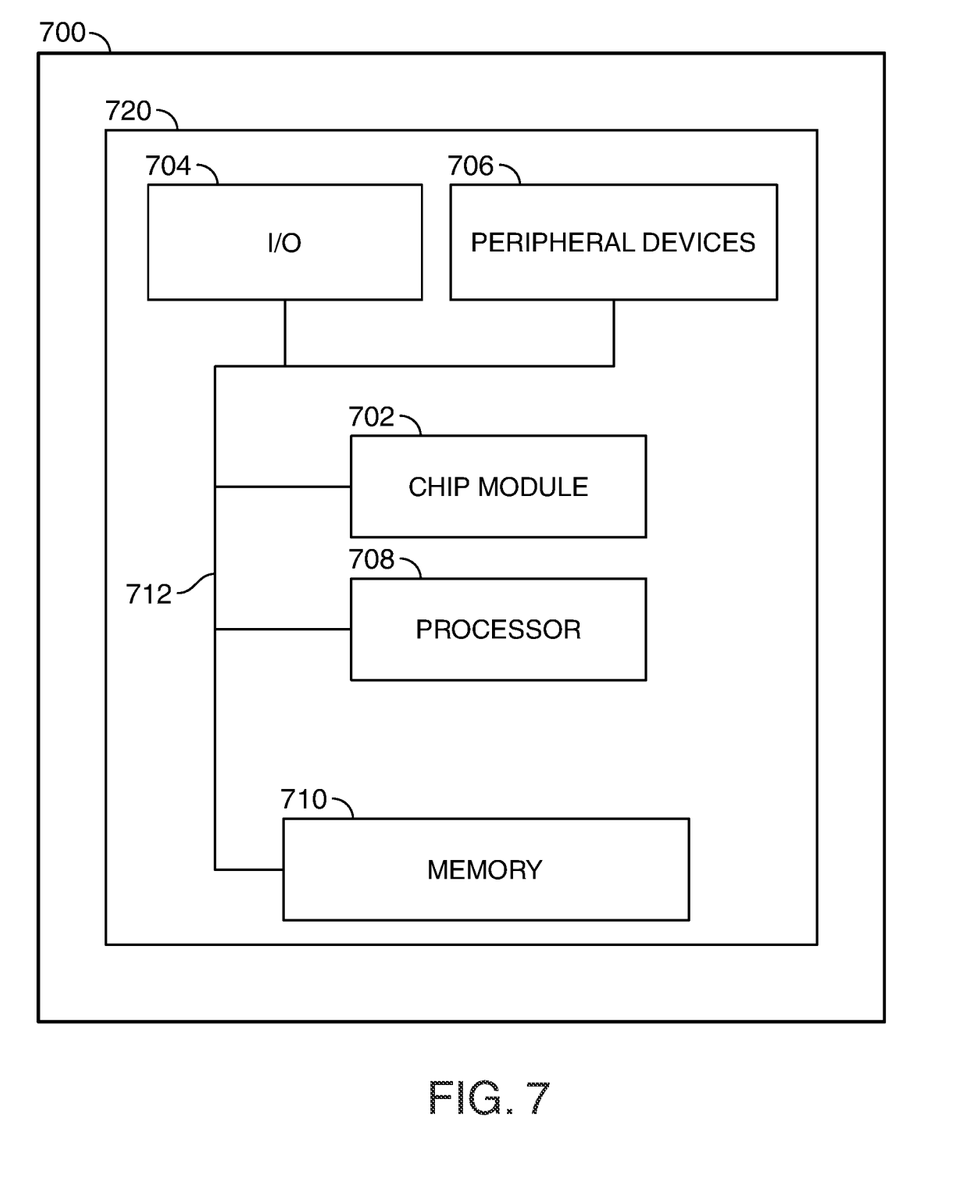
FIG. 7 shows an illustrative apparatus that may be configured in accordance with principles of the disclosure.

FIG. 7 shows an illustrative apparatus 700 that may be configured in accordance with the principles of the invention.

Apparatus 700 may be a computing machine. Apparatus 700 may include one or more features of the apparatus that is shown in FIG. 6.

Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable encoded media or devices; peripheral devices 706, which may include counter timers, real-time timers, power-on reset generators or any other suitable peripheral devices; logical processing device 708, which may maintain a metaverse session, interface with devices, manage metaverse interactions, verify user identity and perform other methods described herein; and machine-readable memory 710.

Machine-readable memory 610 may be configured to store in machine-readable data structures: customer account data, metaverse registration or opt-out, metaverse session audit logs, avatar authentication data, and any other suitable information or data structures.

Components 702, 704, 706, 708 and 710 may be coupled together by a system bus or other interconnections 712 and may be present on one or more circuit boards such as 720. In some embodiments, the components may be integrated into a single chip. The chip may be silicon-based.

Thus, systems and methods for establishing an alternative transaction gateway when a default transaction network is down leveraging low-orbit satellites is provided. Persons skilled in the art will appreciate that the present invention can be practiced by other than the described embodiments, which are presented for purposes of illustration rather than of limitation.

What is claimed is:

1. A method for establishing an alternative transaction gateway when a default transaction network is down, the alternative transaction gateway leveraging a network of low-orbit satellites, the method comprising:
   creating, using a first internet of things ("IoT") device, a non-fungible token ("NFT") associated with a transaction executed at the first IoT device, the NFT comprising:
      a geo-location of the first IoT device;
      an ownership of the first IoT device; and
      transaction data;
   storing, using the first IoT device, the NFT at the first IoT device pending proximity to a satellite antenna;
   receiving, using a second IoT device hosting the satellite antenna, the NFT from the first IoT device;
   transmitting, using the second IoT device, the NFT to a first low-orbit satellite when the first low-orbit satellite is within a first pre-determined proximity to the second IoT device, the first low-orbit satellite from the network of low-orbit satellites;
   receiving the NFT, using the first low-orbit satellite when within the first pre-determined proximity to the second IoT device, from the second IoT device;
   running a smart contract, using the first low-orbit satellite, the smart contract stored at the first low-orbit satellite, to identify a pathway for transporting the NFT, the pathway comprising one or more additional low-orbit satellites from the network of low-orbit satellites operating as carriers for the NFT to a centralized server;
   adding to the NFT, using the first low-orbit satellite, first low-orbit satellite data;
   storing, using the first low-orbit satellite, a copy of the NFT in a first satellite blockchain distributed ledger;
   transmitting, using the first low-orbit satellite, the NFT to a second low-orbit satellite identified when running the smart contract;
   receiving, using the second low-orbit satellite from the network of low-orbit satellites, the NFT from the first low-orbit satellite;
   adding to the NFT, second low-orbit satellite data;
   storing, using the second low-orbit satellite, a copy of the NFT in a second satellite blockchain distributed ledger;
   when within a second pre-determined proximity to the centralized server, transmitting, using the second low-orbit satellite, the NFT to a centralized server;
   receiving, via the centralized server, the NFT;
   processing, via the centralized server, the transaction data; and
   transferring, via the centralized server, the NFT to an earth-based blockchain distributed ledger.

2. The method of claim 1 further comprising, following a lapse of a pre-determined amount of time:
   deleting, via the first low-orbit satellite, the NFT from the first satellite blockchain distributed ledger; and
   deleting, via the second low-orbit satellite, the NFT from the second satellite blockchain distributed ledger.

3. The method of claim 1 further comprising, following the transmitting of the NFT from the first low-orbit satellite to the second low-orbit satellite, deleting the NFT from the first satellite blockchain distributed ledger, via the first low-orbit satellite.

4. The method of claim 3 further comprising, following the transmitting of the NFT from the second low-orbit satellite to the centralized server, deleting the NFT from the second satellite blockchain distributed ledger, via the second low-orbit satellite.

5. The method of claim 1 wherein each entry into the first satellite blockchain distributed ledger and the second satellite blockchain distributed ledger are broadcast as blocks in the earth-based blockchain distributed ledger.

6. The method of claim 1 wherein the first IoT device and second IoT device is one of a point-of-sale ("PoS") device, automated teller machine ("ATM") and smartphone.

7. The method of claim 1 wherein the first low-orbit satellite and the second low-orbit satellite are pre-registered with an entity network associated with the centralized server.

8. The method of claim 1 further comprising, reserving, via the smart contract at the first low-orbit satellite, the one or more additional low-orbit satellites identified for the pathway for transporting the NFT.

9. The method of claim 1 further comprising optimizing the pathway, via the smart contract at the first low-orbit satellite, based on a transaction type associated with the transaction data.

10. The method of claim 9 wherein the transaction type is one of a low-value transaction, high-value transaction, a time-sensitive transaction, claims settlement transaction and a refund transaction.

11. The method of claim 10 further comprising, when the transaction type is time-sensitive, the method comprises selecting, via the smart contract, a one or more additional low-orbit satellites from within the network of low-orbit satellites that enables a quickest transmission of the NFT to the centralized server.

12. The method of claim 1 wherein the NFT is a first NFT and the method further comprises:
 receiving, using the second IoT device, a second NFT and a third NFT;
 creating, using the second IoT device, a cluster of NFTs, the cluster of NFTs comprising the first NFT, the second NFT and the third NFT; and
 when the first low-orbit satellite is within the first pre-determined proximity to the second IoT device, transmitting the cluster of NFTs to the first low-orbit satellite using the second IoT device.

13. The method of claim 12 wherein, when the first low-orbit satellite is within the first pre-determined proximity to the second IoT device, the method further comprises:
 receiving, via the first low-orbit satellite, the cluster of NFT's from the second IoT device; and
 identifying the pathway, via the smart contract, for each of the first NFT, the second NFT and the third NFT.

14. A method for establishing an alternative transaction gateway when a default transaction network is down, the alternative transaction gateway leveraging a network of low-orbit satellites, each low-orbit satellite within the network operating as an authentic node, each authentic node maintaining a space-based blockchain distributed ledger, the method comprising:
 creating, via a first internet of things ("IoT") device, a non-fungible token ("NFT") comprising transaction data associated with a transaction executed at the first IoT device, the NFT comprising:
  a geo-location of the first IoT device;
  an ownership of the first IoT device; and
  transaction data;
 storing, via the first IoT device, the NFT at the first IoT device pending proximity to a satellite antenna;
 receiving, via a second IoT device hosting the satellite antenna, the NFT from the first IoT device;
 transmitting the NFT, via the second IoT device, to a first low-orbit satellite when the first low-orbit satellite is within a first pre-determined proximity to the second IoT device, the first low-orbit satellite from the network of low-orbit satellites;
 when the first low-orbit satellite is within the first pre-determined proximity to the second IoT device, receiving, via the second IoT device, the NFT from the second IoT device;
 running, via the first low-orbit satellite, a smart contract stored at the first low-orbit satellite to identify a pathway for transporting the NFT, the pathway comprising one or more additional low-orbit satellites from the network of low-orbit satellites operating as carriers for the NFT to a centralized server;
 adding to the NFT, via the first low-orbit satellite, first low-orbit satellite data;
 storing, via the first low-orbit satellite, a copy of the NFT at the first low-orbit satellite;
 transmitting the NFT, via the first low-orbit satellite, to a second low-orbit satellite;
 receiving the NFT from the first low-orbit satellite, using a second low-orbit satellite, the second low-orbit satellite from the network of low-orbit satellites;
 adding to the NFT, using the second low-orbit satellite, second low-orbit satellite data;
 storing a copy of the NFT at the second low-orbit satellite, using the second low-orbit satellite;
 prior to transmitting the NFT to the centralized server:
  adding to the space-based blockchain distributed ledger, using the second low-orbit satellite, a block comprising the NFT; and
  broadcasting the block, using the second low-orbit satellite, to the first low-orbit satellite;
 when within a second pre-determined proximity to the centralized server, transmitting the NFT to the centralized server via the second low-orbit satellite;
 receiving the NFT, via the centralized server, the centralized server comprising a satellite antenna;
 processing the transaction data via the centralized server; and
 updating an earth-based blockchain, via the centralized server, with a block comprising the NFT.

15. The method of claim 14 wherein each authentic node is authenticated by an entity network associated with the centralized server prior to being added to the network of low-orbit satellites.

16. The method of claim 14 wherein the smart contract comprises rules defined between an entity network, the IoT device and the network of low-orbit satellites.

17. The method of claim 14 wherein the space-based blockchain distributed ledger is synchronized with an earth-based blockchain distributed ledger.

18. The method of claim 17 wherein following the receiving of the NFT at the second low-orbit satellite, the method comprises deleting the NFT from the first low-orbit satellite.

19. A system for establishing an alternative transaction gateway when a default transaction network is down, the alternative transaction gateway leveraging a network of low-orbit satellites, the system comprising:
 an internet of things ("IoT") device configured to:
  create a non-fungible token ("NFT") associated with a transaction executed at the IoT device, the NFT comprising:
   a geo-location of the IoT device;
   an ownership of the IoT device; and
   transaction data; and
  store the NFT at the IoT device pending proximity to a first low-orbit satellite; and
  when the first low-orbit satellite is within a first pre-determined proximity to the IoT device, transmit the NFT to the first low-orbit satellite, the first low-orbit satellite from the network of low-orbit satellites;
 the first low-orbit satellite, when within the first pre-determined proximity to the IoT device, configured to:
  receive the NFT from the IoT device;
  run a smart contract stored at the first low-orbit satellite to identify a pathway for transporting the NFT, the pathway comprising one or more additional low-orbit satellites from the network of low-orbit satellites operating as carriers for the NFT to a centralized server;

add to the NFT, first low-orbit satellite data;
store a copy of the NFT in a first satellite blockchain distributed ledger; and
transmit the NFT to a second low-orbit satellite;
a second low-orbit satellite from the network of low-orbit satellites configured to:
receive the NFT from the first low-orbit satellite;
add to the NFT, second low-orbit satellite data;
store a copy of the NFT in a second satellite blockchain distributed ledger; and
when within a second pre-determined proximity to the centralized server, transmit the NFT to the centralized server;
the centralized server, comprising a satellite antenna, configured to:
receive the NFT from the second low-orbit satellite;
process the transaction data; and
transfer the NFT to an earth-based blockchain distributed ledger;
the first low-orbit satellite configured to, following a lapse of a pre-determined amount of time, delete the NFT from the first satellite blockchain distributed ledger; and
the second low-orbit satellite configured to, following the lapse of the pre-determined amount of time, delete the NFT from the second satellite blockchain distributed ledger.

20. The system of claim 19 wherein the IoT device is one of a point-of-sale ("PoS") device, automated teller machine ("ATM") and smartphone.

* * * * *